United States Patent [19]

Ray et al.

[11] Patent Number: 6,018,722
[45] Date of Patent: Jan. 25, 2000

[54] S.E.C. REGISTERED INDIVIDUAL ACCOUNT INVESTMENT ADVISOR EXPERT SYSTEM

[75] Inventors: Kenneth S. Ray; George Richard Koelsch; Carol Andrews Ray, all of Lancaster, Pa.

[73] Assignee: AExpert Advisory, Inc., Lancaster, Pa.

[21] Appl. No.: 08/879,106

[22] Filed: Jun. 19, 1997

Related U.S. Application Data

[63] Continuation of application No. 08/229,469, Apr. 18, 1994, abandoned.

[51] Int. Cl.[7] ........................................... G06F 17/60
[52] U.S. Cl. ................................. 705/36; 705/35
[58] Field of Search ................................. 705/35, 36, 37

[56] References Cited

U.S. PATENT DOCUMENTS

| | | |
|---|---|---|
| 4,751,640 | 6/1988 | Lucas et al. . |
| 4,752,877 | 6/1988 | Roberts et al. . |
| 4,910,676 | 3/1990 | Alldredge . |
| 4,933,842 | 6/1990 | Durbin et al. . |
| 4,953,085 | 8/1990 | Atkins . |
| 4,984,174 | 1/1991 | Yasunobu et al. . |
| 4,985,833 | 1/1991 | Oncken . |
| 4,989,141 | 1/1991 | Lyons et al. . |
| 4,994,964 | 2/1991 | Wolfberg et al. . |
| 5,006,998 | 4/1991 | Yasunobu et al. . |
| 5,038,284 | 8/1991 | Kramer . |
| 5,101,353 | 3/1992 | Lupien et al. ........................... 364/408 |
| 5,126,936 | 6/1992 | Champion et al. ...................... 364/408 |
| 5,132,899 | 7/1992 | Fox . |
| 5,444,819 | 8/1995 | Negishi ..................................... 395/22 |

OTHER PUBLICATIONS

Jenna Michaels, "Expert Management", Wall Street & Technology, v 9, n 8, pp. 19–20, Apr. 1992.

Cheryl Eberwein, "Smaller Portfolios Snag Greater Investor Interest", Corporate Detroit, v 8, n 12, p. 10, Dec. 1991.

Charles E. Bartling, "Ten Tips for Marketing Your Mutual Funds", American Banker, v 156, n 222, pp. 10A+, Nov. 1991.

Jenna Michaels, Expert Management, Wall Street & Technology, Apr., 1992, p. 19.

Ivy Schmerken, Wall Street's Elusive Goal; Computers That Think Like Pros, Wall Street Computer Review, Jun. 1990, p. 24.

Print–out of Investment Report from Zack's Database, "1401 Financial", Apr. 19, 1996, pp. 1–2.

Robert W. Colby and Thomas A. Meyers, "The Encyclopedia of Technical Market Indicators", pp. V–IX, 1–60, 72, 116, 135, 270, 379, 433, 473, 493, 515 (1988).

Value Line, Inc., "Value/Screen Plus User Manual for Release 1.0", The Walton Group, pp. 1.1–7.7 (1985).

AIQ Incorporated, "AIQ Stock Expert, The Stock & Market Timing System", Quick Start Guide, pp. 1–33, "Contents", pp. vii–xxiv, Chapter II, Road Maps to Using AIQ StockExpert, pp. II–I–II–12, "Chapter VII, Profit Manager", pp. VII–1–VII–30, Chapter IX, Market Plot, pp. IX–1–IX–95, "Chapter X, Ticker Plots", pp. X–1–X–1–13, "Chapter XI, Ticker and Market Charts", pp. XI–1–XI–11.

(List continued on next page.)

*Primary Examiner*—Frantzy Poinvil
*Attorney, Agent, or Firm*—Ratner & Prestia

[57] ABSTRACT

A computer implemented expert securities portfolio investment management system which operates as Registered Investment Advisor. The system automatically defines personal customer objectives, designs individualized investment portfolios, adjusts portfolios for economic environment, researches and selects specific securities, evaluates and determines the proper time to buy and sell customer securities, generates orders to buy and sell customer securities, updates customer account information and provides tax and performance reports. Research data and personal account information are updated on a timely, periodic basis.

23 Claims, 7 Drawing Sheets

OTHER PUBLICATIONS

"Chapter XII, AIQ StockExpert Options Extension", pp. XII–1–X11–37, Chapter XIII, pp., XIII–1–XIII–55 (1992).

D. Nawrocki and K. Staples, "A Customized LPM Risk Measure for Portfolio Analysis", pp. 205–218, Chapman and Hall Ltd. (1989).

United States Securities And Exchange Commission, Washington D.C., "Order Granting Registration Pursuant To Section 203 of the Investment Advisers Act of 1940", In The Matter Of: Aexpert Advisory, Inc., 3615 Columbia Avenue, Lancaster, PA 17603, File No. 801–43349, Mar. 9, 1993, (1 page).

Uniform Application Form ADV, Bar Code No. 96 10 4005, Received by SEC May 28, 1996, (1 page).

Uniform Application Form ADV, Bar Code No. 93 01 4702, Feb. 10, 1993, (13 pages).

S.E.C. REGISTERED INDIVIDUAL ACCOUNT INVESTMENT ADVISOR EXPERT SYSTEM

This application is a continuation of application Ser. No. 08/229,469 filed Apr. 18, 1994 now abandoned.

A portion of the disclosure of this patent document contains material which is subject to copyright protection. The copyright owner has no objection to the facsimile reproduction by anyone of the patent documentation or the patent disclosure, as it appears in the Patent and Trademark Office file or records, but otherwise reserves all copyright rights whatsoever.

FIELD OF THE INVENTION

The present invention relates to investment management systems, and more particularly, to an improved automated investment management system for investing and managing securities portfolios of private individuals, qualified retirement plans or organizations with portfolios.

BACKGROUND OF THE INVENTION

Consumers of financial products and services are faced with a maze of proprietary financial products. Individuals providing investment advice to "small" investors typically have little training in investment analysis. The field of investment analysis is further complicated by numerous methodologies of determining investment strategies. Several of these methodologies include fundamental analysis which is used to evaluate investments on the basis of criteria such as, but not limited to industry group, financial strength, earnings growth rate, sales, quality of management, technical analysis, modern portfolio theory, non-linear mathematical modeling, etc.

Technical analysis seeks to exploit for profit the trends of price movement. Modern portfolio theory correlates risk and return from a portfolio of securities to develop "efficient" portfolio systems. Non-linear mathematical modeling incorporates neural network optimization methodologies to extract optimal performance from both fundamental and technical data.

Rapidly changing markets demand rapid response and responsible decision making which results from rigorous analysis. Human financial advisors simply do not have the time or expertise to devote to the "small" investor. One alternative available to investors is to purchase mutual funds, however, the "pooled funds" approach used by mutual funds does not provide individualized investment management or consider the customer's whole portfolio. Accordingly, the pooled funds approach fails to provide maximum individual returns with minimum risk.

SUMMARY OF THE INVENTION

The present invention operates in a manner totally distinct from other investment management systems. Each customer portfolio is designed in a separate and distinct fashion; i.e., there are no pooled funds as with mutual funds which "pool" the assets of a number of shareholders. This distinct feature has been further underscored by the Securities and Exchange Commission which has determined that the company employing the technology operates as, and is registered as a "Registered Investment Advisor". The unique nature of each portfolio permits the holistic approach to individual portfolio management necessary to minimize systematic risk and create efficient portfolio design. Daily analysis of every asset in every portfolio permits rapid and unbiased response to portfolio or environmental conditions. Buy and sell decisions are based upon methodologies which are verifiable and prudent for fiduciaries.

The present invention further relates to providing an expert investment management system for novice investors and professional financial advisors. Individuals with little prior background in investment or computer systems can easily use this invention to outperform most professional human investment managers. This powerful tool enables untrained individuals to manage their portfolio with superior expertise, integrity and single minded devotion to achieving their personal objectives, and avoids the need for investors to interact with a salesperson.

The present invention further relates to providing a comprehensive accounting of financial information including performance, transactions, capital gains and losses, dividends, interest, etc.

The present invention is embodied in an improved automated investment system which operates as a Registered Investment Advisor to individually manage customer accounts. The investment system includes a data processing system, the base station, which performs asset allocation by distributing portfolio assets throughout a variety of different types of investment securities. The base station further performs (1) economic analysis by processing various economic indicators which have an impact on the value of securities, (2) fundamental analysis by processing corporate earnings, characteristics of management, quality of financial strength and product information, (3) technical analysis by identifying patterns of price and volume of securities for purpose of exploiting price trends of securities for financial gain and (4) risk/return analysis by processing total returns and systematic risk in a manner known by those skilled in the art as "modern portfolio theory" to compare the investment environment to current customer account holdings. All of this analysis may be performed without human interaction.

The present invention also allows providers of financial services to individually manage a multitude of separate and distinct customer accounts for a fraction of the cost of more expensive, less effective human management. Specifically selected securities and instruments such as stocks, corporate and municipal bonds, mutual funds, certificates of deposit, government securities, money markets, etc. are individually bought and sold for each account at the proper time and price.

Furthermore, according to the present invention, various securities and instruments are individually chosen from selected populations of securities spanning 294 separate groupings of securities types designated as "asset classes". The data describing these investments and identifying the underlying securities are stored in an inventory file resident in the base station.

In addition, another data processing facility referred to as the "Hub" distributes refreshed research data to the Base Stations. Base stations are typically located in the premises of a financial service provider. Base Stations govern the management of customer accounts assigned to the particular Base Station. This architecture of distributed processing permits individualized management of an unlimited number of unique customer accounts.

The financial service provider determines which population of research data will be used to support the management model. The research information which is displayed is determined by the customer account number, therefor different customers may be provided with different recommendations offered by the different financial service providers with whom the customer is associated.

Data describing the available and recommended investments are transmitted by the Base Station to terminals located on the premises of subscribing customers. Recommended investments may also be forwarded to subscribing customers via fax modem if the customer so chooses. Each customer's terminal is able to communicate with the financial service provider's Base Station through a standard telecommunications link by using communications software. When a customer accesses the base station to view personal account information, electronic mail, personal investment recommendations, general investment recommendations or perform transactions, a file pertaining to the customer is opened in anticipation of requests to display specific research and account information and to perform specific transactions.

After viewing recommended transactions, research recommendations, personal account information, electronic mail or performing transactions, the customer may decide whether to invest, print reports or exit the system. If the customer chooses to invest, transactions are entered by the customer and provided to the financial service provider for processing. If the customer chooses to print reports, the reports are stored in a file to be printed when the customer exits the system. When the customer exits the system, a file transfer protocol transmits information to the customers terminal for subsequent printing on the customer's printer. Following completion of the file transfer procedure, the customer files are closed and communications are terminated. Upon completion, investment transactions are confirmed, and the customer's file is updated through an electronic update procedure.

BRIEF DESCRIPTION OF DRAWINGS

The foregoing and other aspects and advantages of the invention will be better understood from the following detailed description of the invention with reference to the drawings, in which.

DETAILED DESCRIPTION OF THE INVENTION

Figure 1:
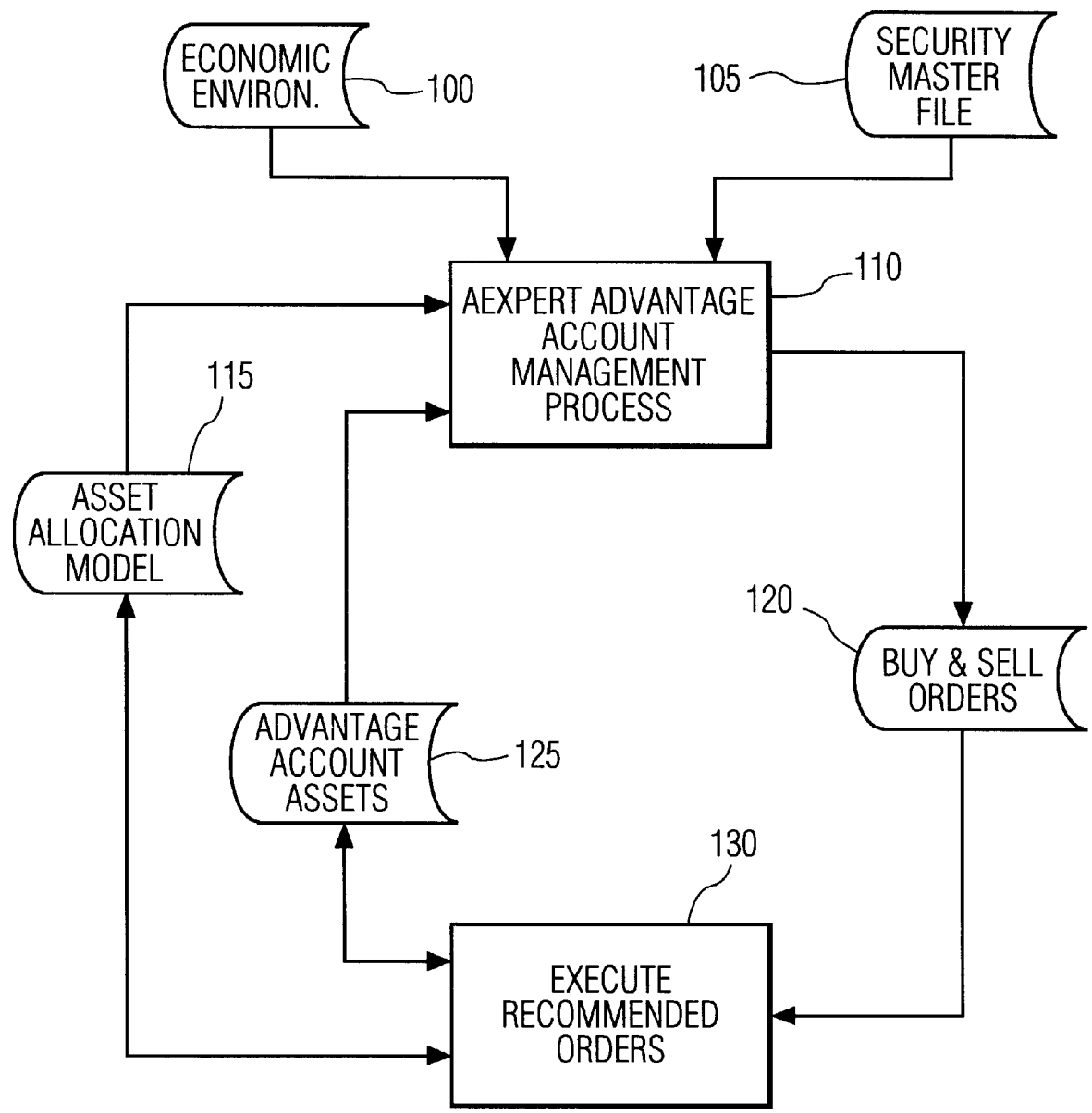
FIG. 1 is a flow chart of the management process of the present invention.

FIG. 1 is an exemplary overview of the Æxpert management system. Flowing into the Æxpert Advantage Account management process is data concerning the Economic Environment 100, a security master File 105, an Asset Allocation model 115 and Advantage account assets 125. The output data of Æxpert Account Management process 110 is Buy & Sell orders 120 which can be executed at execute recommended orders 130 which in turn interact with the asset allocation model 115 and Advantage accounts assets 125.

Figure 2:
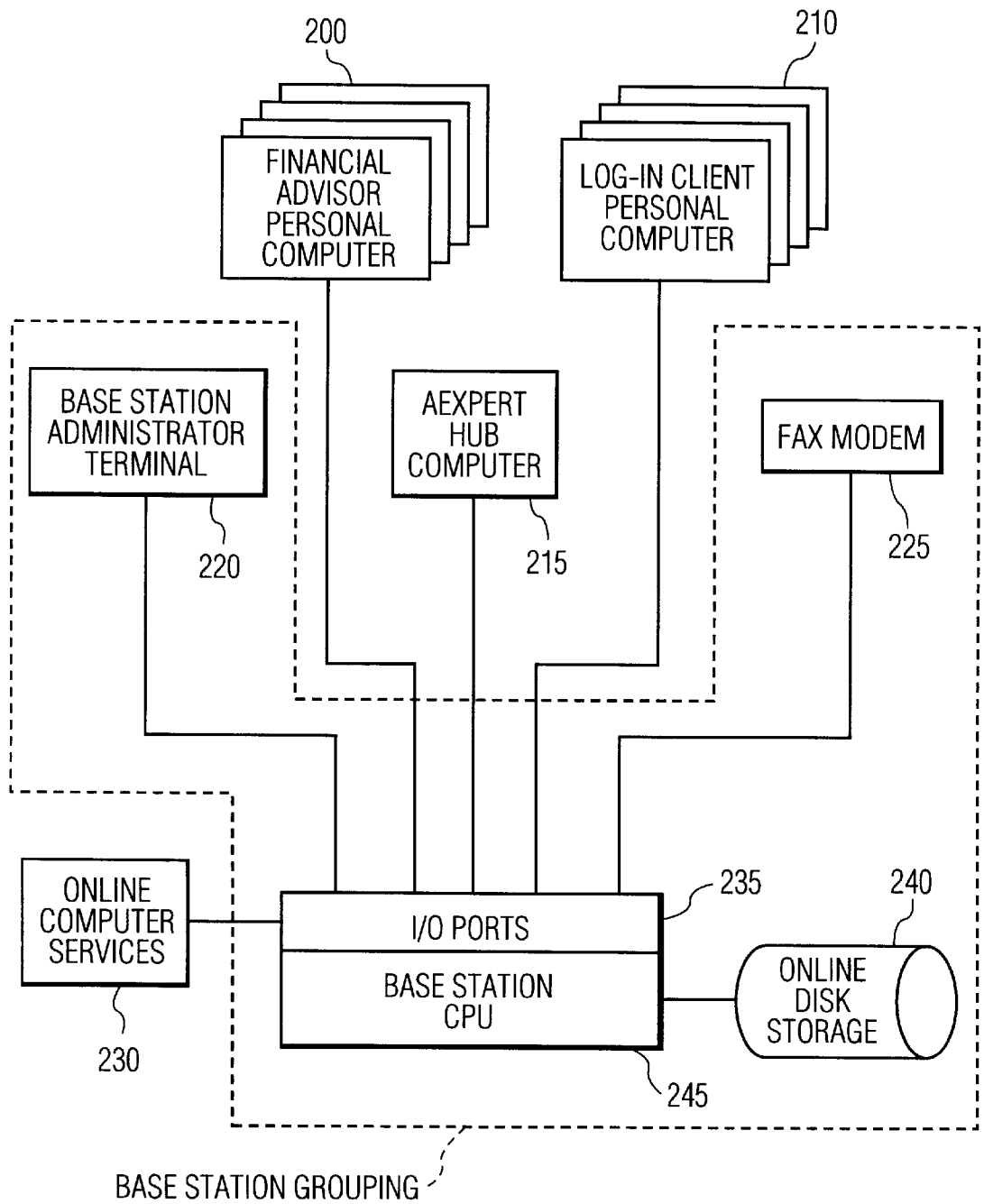
FIG. 2 is a flow chart describing the distributed processing architecture of the hub machine, base station and communication with user terminals.

The system hardware configuration for the exemplary embodiment of the present invention is shown in FIG. 2. The system hardware configuration includes a central processing unit (CPU) which is hub computer 215. Æxpert hub computer 215 distributes timely research data to data processing facilities shown as Base Stations 245 which are typically located proximate to the financial service provider. Base Stations 245 perform the data processing steps set forth in FIGS. 1, and 3–7.

Returning to FIG. 2, the Æxpert Hub computer 215 and Base Stations 245 could comprise a personal computer capable of accommodating the large number of portfolio evaluations, transactions, administrative functions and storage of corresponding data which the exemplary embodiment of the present invention will typically handle. For example, an IBM compatible PC with a 486 processor, containing 4 megabytes of random access memory and a 100 megabyte or larger hard drive could be used. Also included in is Base Station administration terminal 220 which is used for system administration of the base station grouping.

The base station 245 includes a central processing unit and I/O ports 235 for interfacing with the central processing unit. The I/O ports 235 provide interface with the base station using modems and/or printers. The I/O ports 235 allow financial advisor personal computers 200 and log-in client personal computer 210 to access the base station 245 to enter data, receive data, initiate transactions, and to otherwise communicate with the operating program and storage files resident in Base Station 245. The financial advisor personal computers 200 and log-in client personal computer 210 may be, for example, terminals which emulate ANSI, VT 100 or VT 102 communications protocol. In addition, these terminals may use Hayes compatible modems and printers to interface with base Station 245 through I/O ports 235. Typically, each one of the personal computers 210, 200 includes a CRT monitor and a keyboard, and is connected to a printer so that a hard copy of the information displayed on the CRT or processed at the Base Station 245 can be obtained.

FIGS. 1, 3, 4, 7, and 8 describe interrelated data processing and operational flow paths which typically occur in practicing the exemplary embodiment of the present invention. "ÆXPERT ADVANTAGE Account Structure" represents an internal Registered Investment Advisor (hereafter "RIA") operation pertaining to customer information. The information is reviewed on a daily basis to reflect changes in customer account status including market price and fluctuation of customer portfolios.

FIG. 1 shows the five stage process of the exemplary embodiment of the present invention. The five (5) step process includes: (1) economic environment 100, (2) security master file 105, (3) asset allocation model 115, (4) advantage account assets 125 and (5) buy and sell orders 120.

The first step is to determine the personal asset allocation model 115 which is derived from a look up table according to customer answers to a questionnaire. The process for determining the asset allocation model is shown in FIG. 6.

Asset Allocation Model 115 is produced using customer answers to questions of the on-line questionnaire 605

Figure 6:
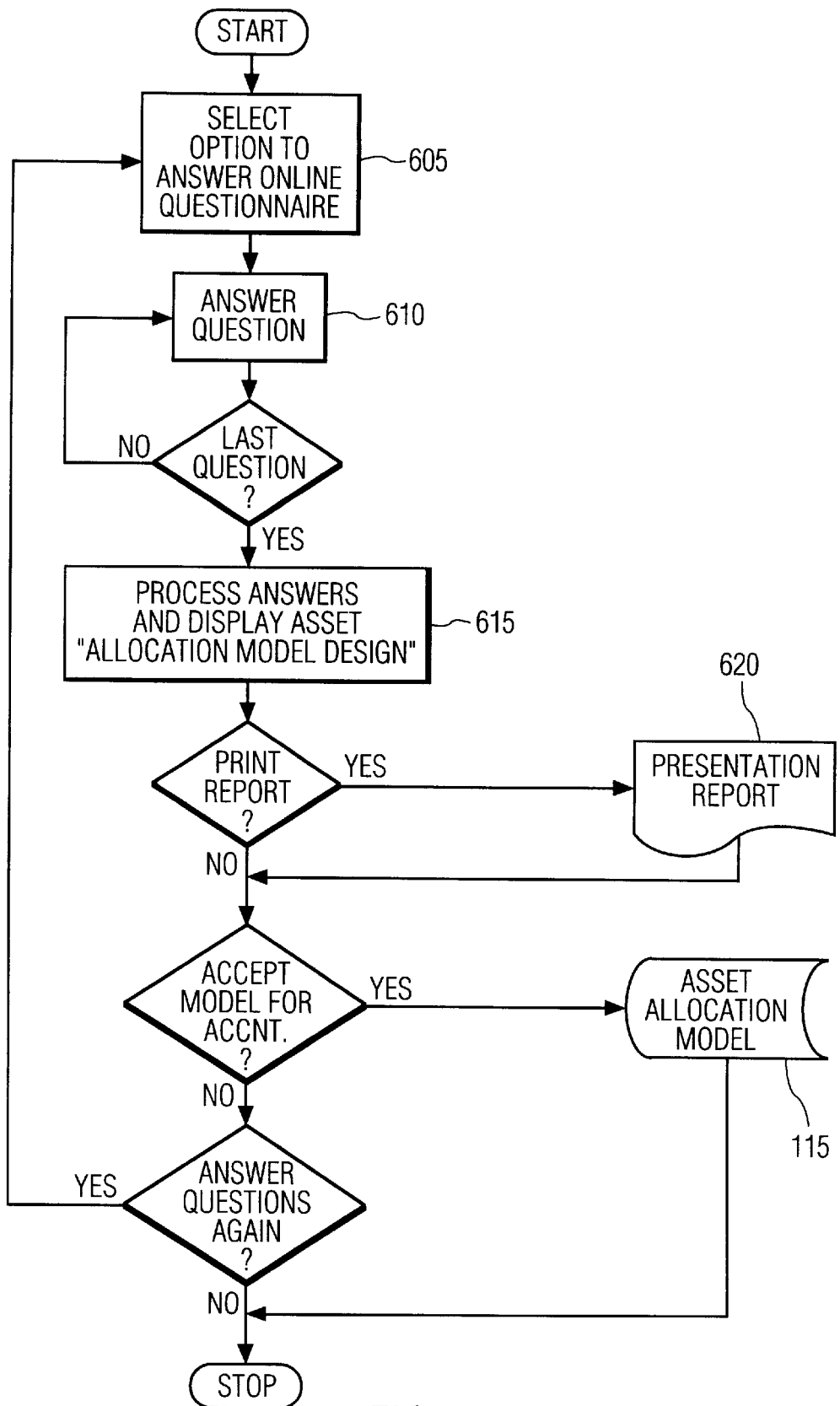
FIG. 6 is a flow chart depicting the process by which a customer answers a personal questionnaire thus providing the information by which a personal asset allocation model is determined, installed and/or by which a customized written presentation report is provided to the customer.

(shown in FIG. 6). More than 20 questions with a median of 4 answers each are used to gather information about the client regarding demographics, risk tolerance, investment preferences, investment horizon and other information. Answers to questions are assigned weights and correlations between answers which allow segmentation to be performed to appropriately determine which of 294 separate asset classes are most suitable to achieve particular customer objectives within a range of portfolio values between one dollar and ten million dollars. For example, a customer may indicate that he or she is 35 years old, saving for retirement, is fiscally conservative, prefers mutual funds as an investment vehicle and has $10,000 to invest. The system compares these variables to answers on a look-up table to determine which level of risk is appropriate to the investor and which types of investments are appropriate to the investor. The look-up table contains a risk gradient ranging from one (representing lowest possible risk) to seventy five (representing highest possible risk).

Each portfolio is assigned a numerical risk ranking between or including one and seventy five. The numerical ranking is identified by summing point values assigned to each answer on the customer questionnaire and correlating the sum of customer scores to determine its position relative to the entire range of scores. This approach permits the customer an extensive number of possible portfolio designs. This breadth of diversity permits unusual depth of precision for asset allocation model design and is the beginning of the individualized management process. This design allows the exemplary embodiment of the present invention to operate as a RIA as determined by the Securities and Exchange Commission.

As is shown in FIG. 6, customer answers to the questionnaire provided at step 610 are stored and a temporary customized asset allocation model 615 is created and displayed on a screen for approval by customer. Following such approval asset allocation model 615 is stored in a file linked to the customer's asset allocation model 115. The file may be used to govern the management process and/or to generate a customized presentation report 620. The presentation report 620 is then provided to the customer and a summary of presentation report 620 is maintained by the financial advisor in a customer file to serve as a compliance tool by verifying answers to customer questionnaire as selected and approved by customer. Also stored in the asset allocation model is risk rating 370, account value 375, recommended asset type 380 and recommended asset amount 385 (shown in FIG. 3).

Figure 3:
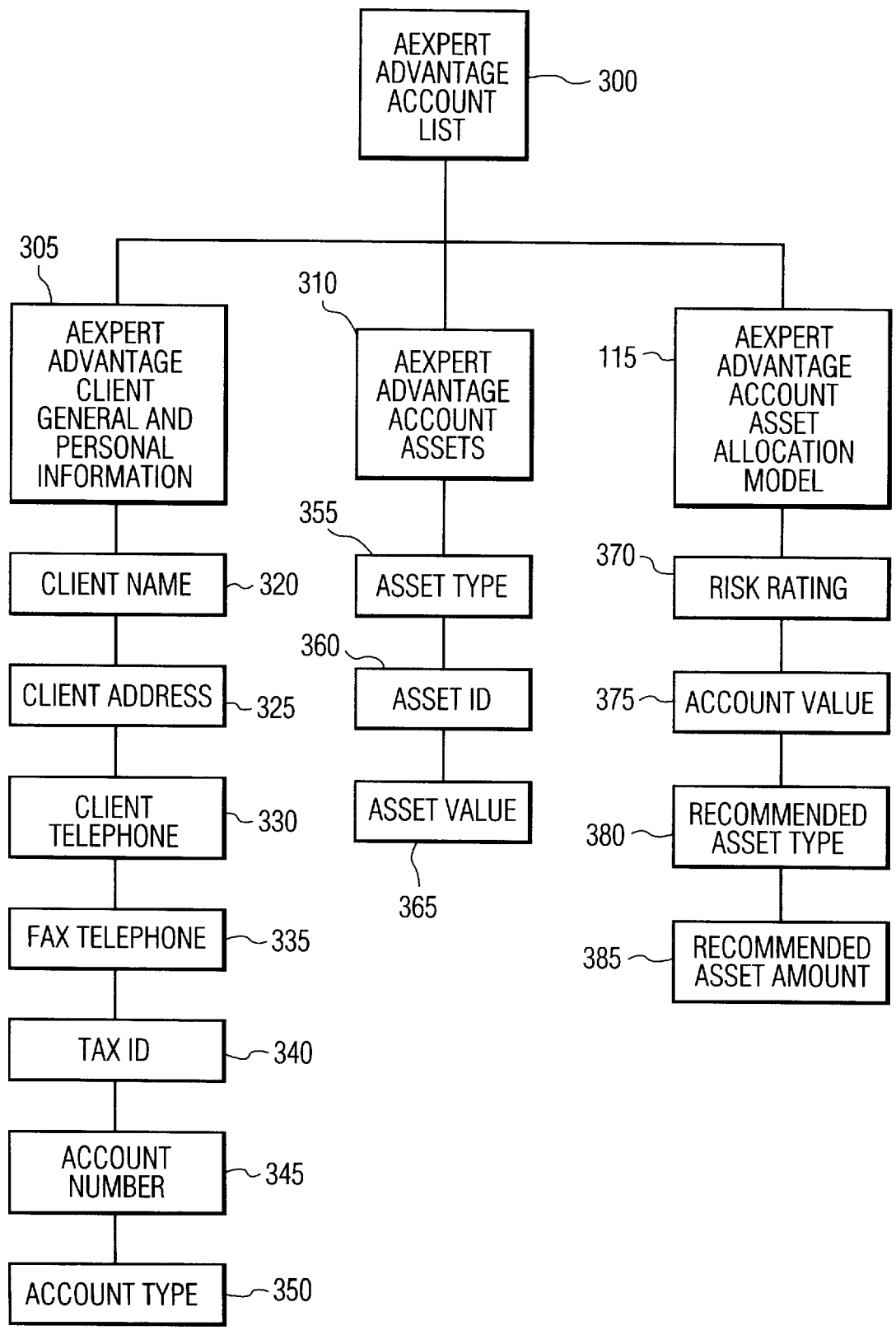
FIG. 3 is a flow chart which depicts the data used by the expert system automatic management feature (which is called Æxpert™ Advantage) to compare existing portfolio holdings with recommended portfolio holdings.

In addition, as shown in FIG. 3, data for client general and personal information 305 and advantage account assets information 310 are also stored for each customer. General and personal information 302 includes customer name 320, address 325, telephone number 330, fax telephone number 335, taxpayer identification number 340, account number 345, account type 350. Account assets information 310 is a customers portfolio information which includes asset types 355, asset identification or cusip numbers 360, and asset value 365.

Figure 4:
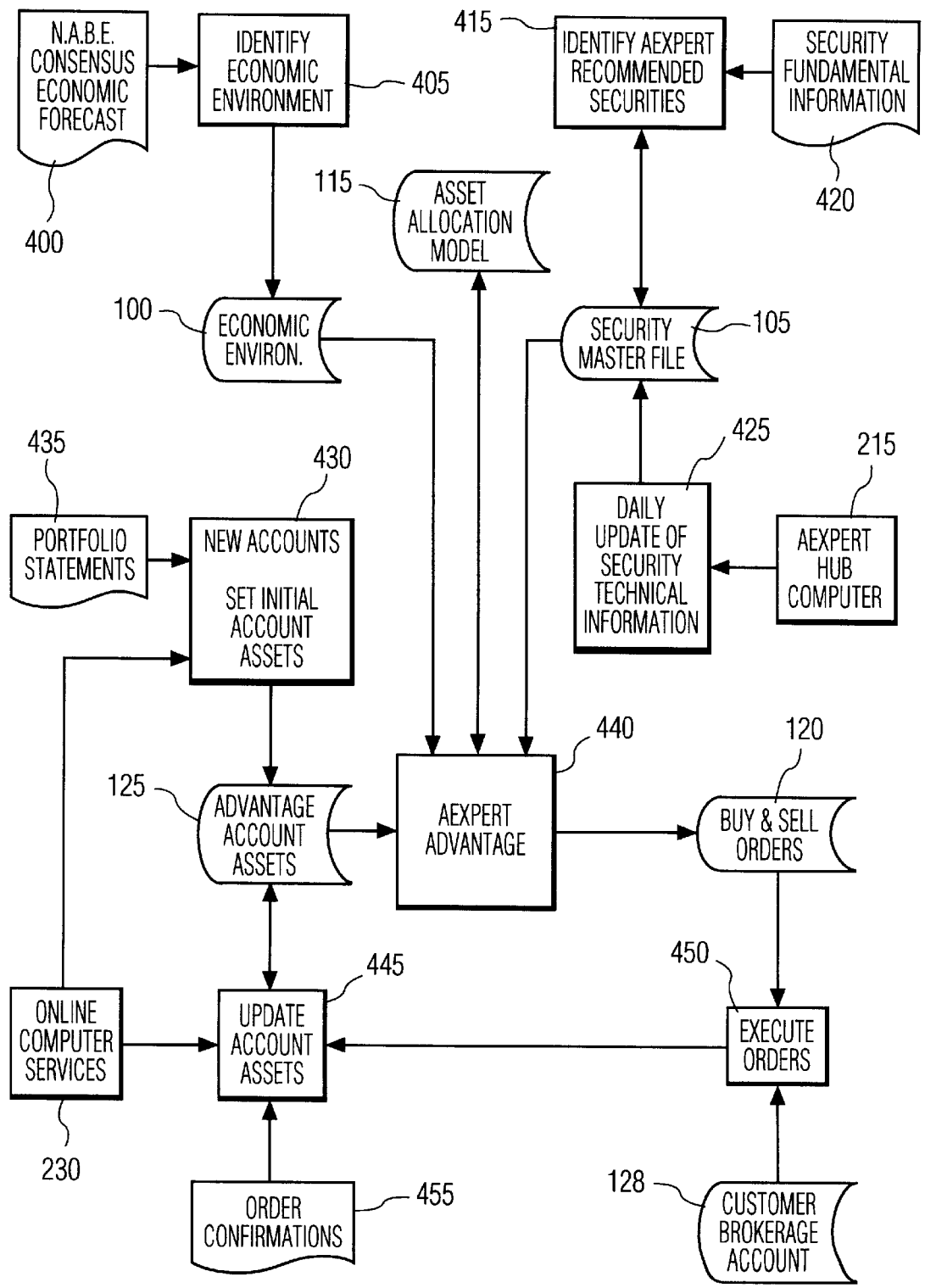
FIG. 4 is a flow chart describing the expert system automatic management process.

Next, as is shown in FIG. 4, the economic environment 100 is determined by an independent source of economic data such as that provided by the National Association of Business Economists 400 and categorized into one of six different economic environment scenarios 405 which characterizes today's economy. The economic environments currently include: rapid growth high inflation, stable growth modest inflation, slow recovery, classic cycle, recession, and depression. Each scenario attributes different weights to asset classes by using a look up table in which weighting values are determined by any qualified source of economic data from asset allocation model 115, and fundamental analysis information 420. One exemplary source of qualified economic data is Lipper Analytical, a company, which generates such economic data. The various weights permit a portfolio manager governing the operation of the system to readily increase or decrease percentage holdings of equity, fixed income or short term fixed income assets throughout all portfolios managed by the system. The economic environment 100 is provided to z,900 xpert Advantage 440 which is also shown in greater detail in FIG. 7.

Next, as is shown in FIG. 4 fundamental analysis information 420 is used to determine which specific securities exhibit superior investment characteristics based upon information from a database containing fundamental analysis information about each population of securities for each asset class. A database containing fundamental information may be sorted to determine which companies exemplify the most favorable fundamental characteristics for a particular investment objective. For example, companies such as ValueScreen, Zack's, and Institutional Broker Estimate System (IBES) provide such fundamental information. Fundamental characteristics are described in books such as *How to Buy Stocks* by Louis Engle and Brendan Boyd (Bantam), *The Intelligent Investor* by Benjamin Graham (Harper & Rowe) or *One Up on Wall Street* (Penguin) and *Beating the Street* (Simon and Schuster), both by Peter Lynch, each of which is incorporated herein by reference for their teachings on fundamental analysis and fundamental characteristics.

Fundamental analysis derives investment decisions from the study of numerous forms of information about a company including, but not limited to, earnings per share, financial strength, sales, book value, dividend growth rate, etc. An example of a fundamental indicator is financial strength in which a stock or bond is rated A+, A, A−, B+, B, B−, C+ or $C_{1-}$.

Next, those securities which are selected for each asset class on the basis of fundamental analysis information 420, are analyzed using statistical technical analysis 425. Each day, or at such time interval determined by Base Station owner or in "real time", prices are updated on the base station 425 to reflect the most recent price and volume of securities, thus providing the raw data necessary to perform statistical technical analysis. "Real time" is defined as the speed at which transactions are reported via electronic pricing media direct from the securities exchanges. How to perform Technical statistical analysis is described in *The Encyclopedia of Technical Market Indicators* by Robert W. Colby and Thomas A. Meyers (Business One Irwin), which is incorporated herein by reference for its teachings on performing technical analysis. Each security analyzed at this step is classified in one of five trading zones: (1) buy, (2) buy/hold, (3) hold, (4) sell/hold and (5) sell.

Technical analysis derives investment decisions from the study of, for example, price and volume information. Numerous derivative analyses are possible including, for example, advance/decline ratio, commodity channel index, cumulative volume index, Federal funds—prime rate spread index, McClellan oscillator, parabolic time/price system, relative strength index, stochastic, and TICK index. Many technical indicators are derived from information regarding quantity of securities traded during a particular time period and price at which the securities traded. An example of a technical indicator is the relative strength index which is expressed mathematically as $RSI = 100 - (100/(1+RS))$ where RS is the ratio of the exponentially smoothed moving average of n-period gains divided by the absolute value of the exponentially smoothed moving average of n-period losses.

Those securities which are classified as being in the buy zone are further tested using risk return analysis 720 shown in FIG. 7 (described below). *Portfolio Selection: Efficient Diversification of Investments*, Markowitz, New York: John Wiley and Sons, 1959 and "A Customized LPM Risk Measure for Portfolio Analysis", Nawrocki and Staples, (1989), and *Applied Economics*, 21, pp. 205–218, each of which is incorporated herein for their teachings on risk return analysis, describe how to perform risk return analysis. This analysis is performed to determine if the risk/return ratio is improved by the addition of the recommended security to a particular portfolio. If the risk/return is improved, then a specific buy transaction instruction which identifies quantity, price and description of the security for the account is generated and stored in Base Station 245, shown in FIG. 2, for later transfer to a financial advisor who is registered as a solicitor for that customer's account or to the customer.

Risk return analysis is a statistical technique which compares total investment return of a population of individual securities using statistical analysis. This type of analysis results in a quantitative measure of risk and return. The impact of individual securities is compared to specific portfolios to determine if the inclusion of a given individual security increases or decreases the risk/reward ratio for a given portfolio.

Returning to FIG. 2, the transfer of recommended transaction information is accomplished through I/O ports 235 and financial advisor personal computer 200 if customer is a financial advisor or log-in client personal computer 210 if customer is a personal investor. Alternatively, the information may be provided to the financial advisor or customer via facsimile.

Each day every asset in every portfolio is evaluated using the technical analysis. Those securities which are classified by technical analysis as being in a sell zone and which are not recommended by the fundamental analysis, generate a specific sell transaction. The sell transaction identifies quantity, price and description of the security held in the account and stored in the Base Station 245 for later transfer through an interface device to the financial advisor registered as a solicitor of the customer's account or to the customer.

A second flow path shown on FIG. 4 describes administrative functions which support the management process. These functions include buy and sell transactions 450, updating of account information 445 and updating of Advantage account assets 125. In this embodiment account information 445 is updated using an electronic updating capability such as that provided by Schwablink from Charles Schwab & Co., Inc. The interaction of the first and second flow paths are important.

Referring now to FIG. 4, shown are the operational flow and data processing steps which are used to determine economic environment 100. A baseline customer asset allocation model is first derived from a look-up table. The baseline customer asset allocation models are adjusted according to one of six possible currently allowable economic environments including rapid growth high inflation, stable growth modest inflation, slow recovery, classic cycle, recession and depression. Each economic environment places specific weights on asset classes based on the historic performance of those assets. The weight of specific assets are reduced or increased using this weighting process. The weights are derived from a review of historic data.

For example, consider an asset class which has a weighting of 1.1 which has been derived from the economic environment 100. If the baseline equity portfolio for the baseline customer Asset Allocation model is 30%, then an increase of equity weighting to 33% results. 33% as a new baseline for the equity portfolio is derived by multiplying 1.1 by 30% (1.1*0.30)*100=33%. A weighting of 0.85 could decrease a baseline portfolio weighting from 30% fixed income investments to 25.5%. These weights may be changed by manually adjusting a look-up table at the request of a human Registered Investment Advisor or by using a neural network.

Selection of a particular economic environment adjusts asset class weights of all customer portfolios under the jurisdiction or control of the Registered Investment Advisor. This architecture permits the Registered Investment Advisor to immediately and properly adjust asset class weights for all customer accounts by one adjustment to economic environment 100.

Figure 5:
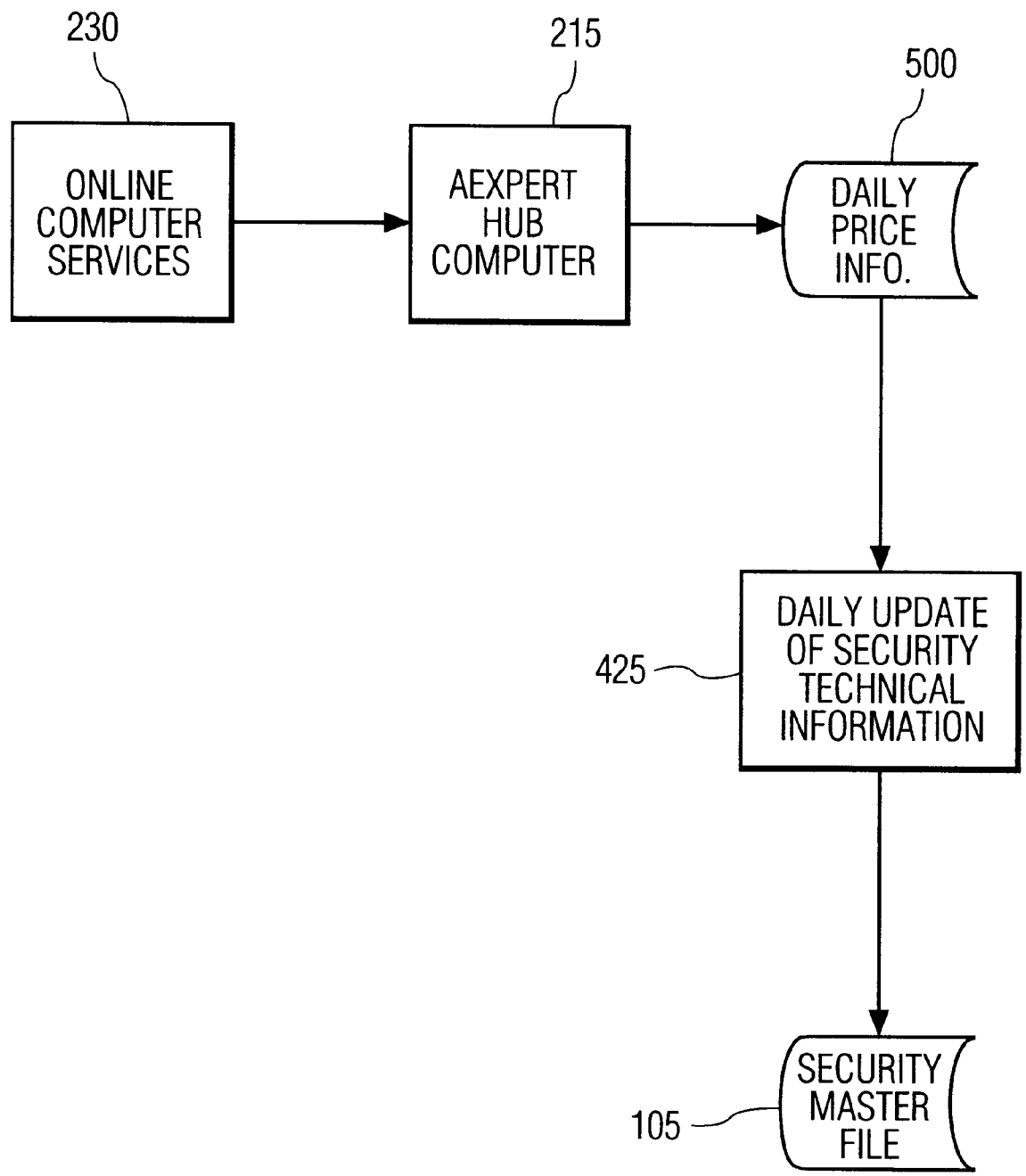
FIG. 5 is a flow chart describing the timely update of research data supporting the management model of the present invention.

Æxpert Recommended Securities are initially identified 415, FIG. 4, for each asset class by initially using fundamental securities information 420. Such fundamental information may be obtained through information derived from database sorts of financial strength, earnings, dividend, balance sheet data, industry group, etc. or through evaluation of fundamental data by a neural network. Concurrently, as is shown in FIG. 5, on-line financial data services 230, refresh data stored on the Æxpert hub computer 215 by providing recent pricing and volume information 500. Data is evaluated by technical timing algorithms which may be computed from raw data resident in a database or may be determined through evaluation of technical data by a neural network. This evaluation generates a BUY, BUY/HOLD, HOLD, SELL/HOLD or SELL classification which is stored in the security master file 105 shown in FIG. 4.

Figure 7:
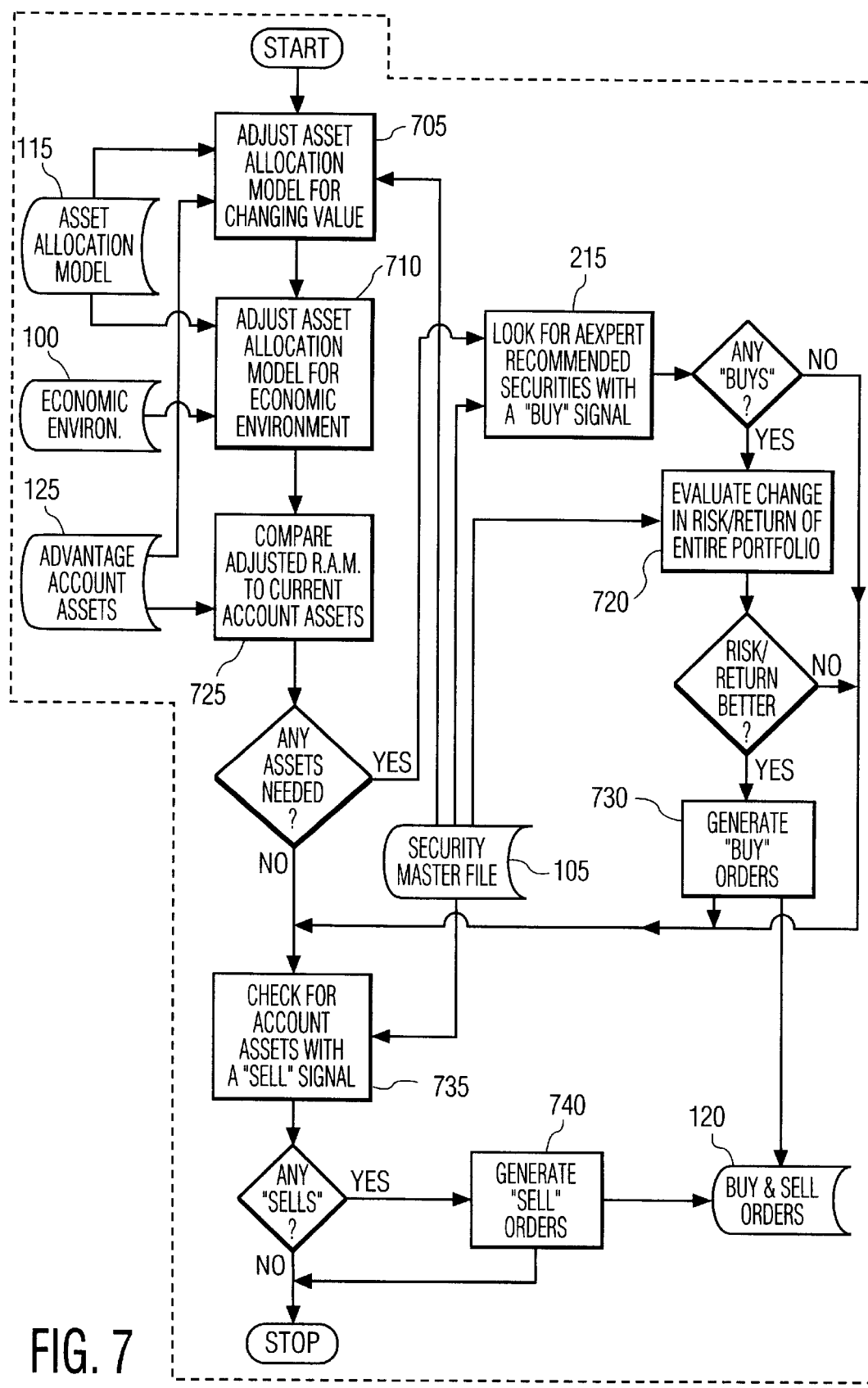
FIG. 7 is a flow chart further depicting adjustments to the asset allocation model.

Securities which qualify for purchase on both a fundamental and technical basis, as shown at step 715 of FIG. 7, are evaluated for their impact on the specific portfolio for which they are being considered according to risk/return ratio 720. Modern portfolio theory such as that described by *Portfolio Selection: Efficient Diversification of Investments*, Markowitz, New York, John Wiley and Sons, 1959 and "A Customized LPM Risk Measure for Portfolio Analysis", Nawrocki and Staples, (1989), *Applied Economics*, 21, 205–218, each of which is incorporated herein for their teachings or portfolio theory, is used to determine those securities which provide a higher calculated risk/return ratio for the portfolio when the specific security is included in the portfolio than when the portfolio does not include the specific security.

Securities that improve the risk/return ratio generate a "BUY" order 730, shown in FIG.7, for the appropriate amount of the security according to the asset allocation model 115 shown in FIG. 6, and at the appropriate price according to the technical information included in security master file 105 shown in FIG. 4. Orders 120 are generated to a computer screen to be viewed by users of the system or to an output device such as printer or fax modem 225, shown in FIG. 2.

Returning to FIG. 7, current assets held in each customer account are thoroughly evaluated on a daily basis. Accounts are initially evaluated by comparing changing market values with asset allocation model 705. Account asset allocation models are evaluated daily based upon changing economic environment 710 of FIG. 7. Adjusted asset allocation models are compared daily to current account assets 725. Account assets are evaluated to determine if any assets have a "SELL" signal 735. Those assets which are identified as having a "SELL" signal generate "SELL" orders 740. Orders 120 are generated to a computer screen to be viewed by users of the system or to an output device such as printer or fax modem 225 of FIG. 2.

The updating of financial data files by on-line computer services 230, FIG. 5, and evaluation of customer portfolios as described by FIG. 7 is done prior to the start of each business day. Typically, it is done after business hours on the day prior to the day for which orders are recommended.

In addition, as is shown in FIG. 4, on-line computer services are used to start new accounts 430 and to update account assets 445. Also, Portfolio statements 435 are used to start new accounts. Portfolio Statements include statements from customers who have existing accounts and who wish to use Æxpert to manage their portfolio. The portfolio statement is used as a baseline of the customer's current portfolio to start the new account within Æxpert.

Referring now to the customer file flow path of FIG. 4, if a customer wishes to invest according to recommendations for buy and sell orders 120, the customer may execute orders 450. Upon execution, brokerage account assets are updated 445, order confirmations are generated 455 and Advantage account assets are updated 125.

The customer selects one of three levels of service regarding order notification and execution. These three are Æxpert R.I.A., Æxpert Alert, and Æxpert Manager. Æxpert Manager provides fully automatic account management including order execution based upon system recommendations. It is a fully discretionary management system which does not notify customer prior to order execution. The Æxpert Alert account provides customer notification of recommended transactions via fax modem 225, FIG. 2, and requires the customer to execute the recommended transaction. The Æxpert RIA account provides recommended transactions to a terminal 210, FIG. 2, located at his facility, viewed by the log-in customer and requires the customer to execute the recommended transaction.

Referring again to FIG. 2, a customer seeking to view personal account information, recommended investments or generalized investment information first logs onto the system, steps 210 or 200. Using a keyboard, the customer enters his login name and transmits his login name to Base Station 245 using, for example, a Hayes compatible modem (not shown). Base Station transmits through the modem and to customer computer, 210 or 200, a request for a password. The customer types the password into a keyboard (not shown) and transmits the password via modem to central processing unit of Base Station 245. Upon receipt of this password, the Base Station 245 verifies the password. If the password is verified the customer's file is opened in anticipation of displaying investment recommendations, account information and storing certain transaction data 240. The Base station 245 then accesses the security master file 105, FIG. 4 and the order file 120 to obtain investment data describing the investments being recommended. This investment data is made available for transmission to terminals 210, 200 in FIG. 2. Upon receipt of this data, terminals 210, 200 display the investments being recommended on CRT for review by the customer.

Referring now to FIG. 4 and in conjunction with FIG. 2, displayed with the recommended investments is a prompt which asks the customer whether or not he or she wishes to invest. The interface is menu driven and permits the customer to place transactions through the keyboard of his terminal. Such requested transactions are transmitted via modem to the base station 245. Upon receipt of this transaction data, the base station 245 generates an order outlining the details of the transaction to a printer connected to base station 245. This trade data consists of customer name, account number, number of units to be bought or sold, price per unit, professional financial advisor associated with account and whether customer receives telephone notification upon execution of order.

Orders generated by the base station printer are executed through the broker associated with the customer brokerage account 128, FIG. 4. The broker processes the transaction and notifies the Base Station 245 and the customer of the execution of the order by providing an order confirmation 455, FIG. 4. Commensurate with this, the previously opened customer file stored in storage units 240 is accessed and updated to reflect the customer's transaction by writing the transaction data to the customer account. Confirmation is performed by transmission of trade data identifying a specific security description, a quantity, a transaction price, a commission and a total amount of funds invested as a result of the sale or purchase.

Then, the Advantage account assets 125, FIG. 7, which represent a number of the customer brokerage account or other customer securities holdings held by the broker are adjusted through on-line computer services 230 to reflect the transaction including any corresponding adjustments to cash positions within the customer account. Following review of all desired investment information and completion of all transactions, customer positions the cursor on their CRT to select "EXIT" and presses <Enter>on their keyboard. A request is sent from remote customer terminal 210, 200 FIG. 2, via modem to the Base Station CPU 245.

Upon receipt of the "EXIT" request, the Base Station 245 activates and opens a file to determine whether the customer has requested written reports of electronic mail, investment or account information while the customer was logged on the system. Customers who request such reports activate a communications protocol of the type available through for example, the Kermit system in which Base Station CPU 245 down-loads via modem to personal computer CPU 210, 200 the contents of requested files.

Upon completion of file transfer, files are available for printing by the customer's computer 210, 200 at the customer's facility. Thereafter, the Base Station disconnects modem communication with the customer and closes all related customer files. Customers who do not request reports do not activate the file transfer protocol; instead the Base Station 245 disconnects modem communication with the customer and closes all related customer files.

Referring again to FIG. 7, where market conditions or the like make it necessary or desirable to change the investment recommendations 715, economic environment 100 or rates of the investments being offered 715, or the criteria used to assign a particular asset allocation model to a particular portfolio 115, the information identifying the securities and/or the investment criteria is verified and entered into the keyboard of hub computer 215, FIG. 2, by the appropriate RIA employee. Then, updated information is disseminated via modem to Base station(s) 245.

It is to be understood that a number of variations may be made in the invention without departing from its spirit and scope. The terms and expressions which have been employed in the foregoing description are used in a descriptive and not a limiting sense, and no intention of excluding equivalents of the invention described and claimed is made.

What is claimed:

1. A computer implemented interactive investment management expert system comprising:

hub computer processing means for providing economic environment data and for updating data concerning a plurality of securities to reflect their current market value;

base station processing means including:

means for generating an individualized asset allocation model for an individualized portfolio for an individual account holder from responses to a questionnaire, means for correlating a risk ranking to the responses to the questionnaire and assigning the risk ranking to the individualized portfolio, means for evaluating suitability of account holdings for the individualized portfolio with respect to changes in the market value of the plurality of securities, a current value of the portfolio holdings, and the identified economic environment data, means for generating and storing at least one of a buy recommendation and a sell recommendation of specific ones of the securities for the individualized portfolio based on the evaluation, means for the individual account holder to select a specified broker, and means for coupling the base station processing means to a plurality of brokers including the specified broker, and remote access means for accessing the base station processing means, for reviewing any buy recommendation and sell recommendation for the individualized account, and for transmitting one of a respective purchase request and a respective sale request to the base station processing means, wherein the base station processing means further comprises means for transmitting one of the respective purchase request and the respective sale request to the specified broker.

2. The interactive investment management expert system as recited in claim 1, wherein the asset allocation model includes at least one asset class where the asset class includes at least one corresponding one of the securities.

3. The interactive investment management expert system as recited in claim 1, wherein the base station processing means further includes means for conducting a fundamental analysis to recommend certain ones of the securities, by conducting a technical analysis of the recommended securities, and by conducting a risk/return evaluation with respect to the portfolio holdings and the recommended securities to determine if security transactions to be recommended improve the risk/return ratio for the individualized portfolio.

4. The interactive investment management expert system as recited in claim 1, wherein the base station processing means further includes means for accessing the hub computer processing means to retrieve the identified economic environment data and the updated market value data for the securities and for generating a modified individualized asset allocation model by adjusting the asset allocation model based upon the identified economic environment data and the updated market value data of the securities.

5. The interactive investment management expert system as recited in claim 4, wherein:

the base station processing means further includes:

means for comparing the asset allocation model to the modified asset allocation model to determine whether: (1) first particular ones of the securities are suitable for the individualized portfolio; and (2) second particular ones of the securities in the individualized portfolio should be sold;

means for retrieving the stored buy recommendation indicating the first particular ones of the securities;

means for conducting a risk/return evaluation of the first and second particular securities for the individualized portfolio corresponding to the asset allocation model, means for generating a risk/return ratio output value indicating one of an improved risk/return ratio and not improved risk/return ratio for each of the first and second securities;

means for generating a recommended buy order for any of the first particular securities having an improved risk/return ratio for the asset allocation model; and means for generating a sell order for any of the second particular securities which are determined to be not suitable in the individualized portfolio and should be sold.

6. The interactive investment management expert system as recited in claim 1, wherein the base station processing means includes means for establishing a link between the remote access means and the base station at conventional and unconventional transacting times of a day.

7. The interactive investment management expert system as recited in claim 1, wherein the base station processing means further includes means for automatically generating an automatic purchase request and sale request corresponding to the buy recommendation and the sell recommendation, respectively.

8. The interactive investment management expert system as recited in claim 1, wherein the base station processing means also includes means for recording sale and purchase transactions resulting from the respective purchase request and sale request.

9. The interactive investment management expert system as recited in claim 1, further comprising means, coupled to the base station processing means, for debiting a specified brokerage account of the specified broker corresponding to the individualized account to cover a purchase resulting from the respective purchase request and for crediting the specified brokerage account for a sale resulting from the respective sale request.

10. The interactive investment management expert system as recited in claim 1, wherein the base station processing means further includes means for substituting other recommended securities for one of the buy recommendation and the sell recommendation for the account.

11. The interactive investment management expert system as recited in claim 1, further includes confirmation means, coupled to the base station processing means, for confirming a sale and a purchase corresponding to ones of the respective purchase request and the sale request and for transmitting a confirmation message to the remote access means.

12. The interactive investment management expert system as recited in claim 11, wherein the confirmation means confirms each one of the sale and the purchase by transmitting trade data identifying a specific security description, a quantity, a transaction price, a commission, and a total amount of funds invested as a result of the sale and the purchase.

13. The interactive investment management expert system as recited in claim 1, wherein the base station processing means further includes means for storing customer data used to manage the individualized portfolio.

14. The interactive investment management expert system as recited in claim 1, wherein, the base station processing means includes means for obtaining research data from each of the plurality of brokers and wherein the base station processing means generates the individual asset allocation model based on research data obtained from the specified broker to the exclusion of research information obtained from any other one of the plurality of brokers.

15. The interactive investment management expert system as recited in claim 1, wherein the means for correlating a risk ranking to the responses to the questionnaire includes means for changing a risk indication value based on the response to each question in the questionnaire.

16. The interactive investment management expert system as recited in claim 1, wherein the base station processing means evaluates the asset allocation model for the individual investor each day responsive to the identified economic environment data.

17. A computer implemented interactive investment management expert system comprising:
   a hub computer including
   (a) means for identifying one of a plurality of pre-defined economic environments and for placing weights on asset classes based upon the identified environment; and
   (b) means for updating data concerning a plurality of securities to reflect a current market value of the securities and for storing the updated securities data in a security master file;
   base station processing means including
   (a) means for performing fundamental analysis to recommend ones of the securities, corresponding to data included in the security master file, as one of a buy recommendation and a sell recommendation, and for storing the respective recommendations for the recommended securities;
   (b) means for generating an asset allocation model from responses to a questionnaire for a corresponding individualized portfolio for an individual portfolio holder, for correlating a risk ranking to the responses to the questionnaire and assigning the risk ranking to the individualized portfolio, the asset allocation model including at least one asset class;
   (c) means for accessing the hub computer processing means to retrieve the identified economic environment and the updated market value of the plurality of securities and for generating a modified asset allocation model by adjusting the asset allocation model based upon the identified economic environment and the updated market value of the plurality of securities;
   (d) means for comparing the asset allocation model to the modified asset allocation model to determine whether (1) first particular ones of the plurality of securities are needed in the individualized portfolio and (2) second particular ones of the securities in the individualized portfolio should be sold;
   (e) means for retrieving the stored buy recommendations, for evaluating the securities corresponding to the stored buy recommendations to determine a risk/return ratio of the securities corresponding to the stored buy recommendations for the individualized portfolio corresponding to the asset allocation model, and for generating a risk/return output value indicating if the risk/return ratio is improved;
   (f) means for generating a recommended buy order for each of the securities corresponding to the stored buy recommendations that provides an improved risk/return ratio for the asset allocation model; and
   (g) means for generating a recommended sell order for the second particular ones of the securities which should be sold;
   (h) means for the individual portfolio holder to select a specified broker, and
   (i) means for coupling the base station processing means to a plurality of broker including the specified broker; and
   remote access means for accessing the base station processing means, for reviewing the recommended buy order and the recommended sell order for the individualized portfolio, and for transmitting one of a respective purchase request and a respective sale request to the base station processing means;
   the base station processing means further includes means for transmitting one of the respective purchase request and the respective sale request to the specified broker.

18. The interactive investment management expert system as recited in claim 17, wherein said economic environment is a scenario selected from the group consisting of rapid growth high inflation, slow recovery, classic cycle, recession, and depression, and wherein said identifying means includes a look-up table attributing different weights to asset classes depending on the selected scenario.

19. A computer implemented interactive investment management expert system comprising:
   base station processing means comprising:
   (a) means for generating an asset allocation model, including a plurality of asset classes, from responses to a questionnaire to govern a purchase or sale of securities in a corresponding individualized portfolio for an individual account holder for correlating a risk ranking to the responses to the questionnaire and for assigning the risk ranking to the individualized portfolio;
   (b) means for evaluating suitability of securities in the individualized portfolio with respect to changes in a market price of the securities in the account, a current value of the securities, and an identified economic environment, and for generating and storing a buy recommendation and a sell recommendation for the securities in the individualized portfolio based on the evaluation of the securities, said evaluating means including means for placing weights on the asset classes based on the identified environment;
   (c) means for the individual portfolio holder to select a specified broker, and
   (d) means for coupling the base station processing means to a plurality of broker including the specified broker; and
   remote access means for accessing and reviewing the buy recommendation and the sell recommendation and for initiating a respective purchase request and a sale request;
   the base station processing means further including means for transmitting one of the respective purchase request and the respective sale request to the specified broker.

20. The interactive investment management expert system as recited in claim 19, further comprising means for retrieving the selected economic environment and the current market value of the securities and for generating a modified asset allocation model by adjusting the asset allocation model based upon the economic environment and the current market value of the securities.

21. The interactive investment management expert system as recited in claim 16, further comprising means for comparing the asset allocation model to the modified asset allocation model to determine whether (1) first particular securities are needed and (2) second particular ones of the securities in the account should be sold;

means for retrieving the stored buy recommendation, for evaluating a recommended security corresponding to the buy recommendation to conduct a risk/return evaluation of the recommended security for the individualized portfolio, and for generating a risk/return output value indicating one of an improved risk/return ratio and not improved risk/return ratio;

means for generating a recommended buy order for the recommended security if the recommended security has an improved risk/return ratio for the asset allocation model; and means for generating a recommended sell order for any of the second particular securities which should be sold.

22. The interactive investment management expert system as recited in claim 19, further comprising means for automatically generating one of a purchase request and a sale request based upon the buy recommendation and the sell recommendation respectively.

23. The interactive investment management expert system as recited in claim 19, further comprising means for debiting a specified individual brokerage account of the specified broker/dealer corresponding to the individualized portfolio to cover the purchase resulting from the purchase request and for crediting the specified individual brokerage account for the sale resulting from the sale request.

* * * * *